United States Patent [19]

Ehret

[11] Patent Number: 4,723,852
[45] Date of Patent: Feb. 9, 1988

[54] LOAD COMPENSATING ROLLER BEARING CONSTRUCTION

[75] Inventor: James A. Ehret, Marion, Ohio

[73] Assignee: Dresser Industries, Inc., Dallas, Tex.

[21] Appl. No.: 937,783

[22] Filed: Dec. 4, 1986

[51] Int. Cl.[4] .............................................. F16C 19/30
[52] U.S. Cl. ................... 384/593; 29/148.4 A; 384/620; 384/621
[58] Field of Search ............... 384/593, 421, 591, 620, 384/623, 621; 37/116; 29/148.4 A

[56] References Cited

U.S. PATENT DOCUMENTS

| | | | |
|---|---|---|---|
| 2,163,729 | 6/1939 | Ekbom et al. | |
| 2,513,726 | 7/1945 | Huston | 212/69 |
| 3,131,818 | 5/1964 | Allin, Jr. | 212/69 |
| 3,985,406 | 10/1976 | Baron | |
| 4,023,869 | 5/1977 | Caldwell | |
| 4,329,795 | 5/1982 | Kalve | 37/116 |
| 4,371,086 | 2/1983 | Sankey et al. | 212/253 |
| 4,582,436 | 4/1986 | Merron | 384/593 |

Primary Examiner—Lenard A. Footland

[57] ABSTRACT

An improved load compensating roller support for a device having upper and lower frames moveable with respect to each other and having conical shaped roller bearings, each of which is rotatably mounted on a stretchable rod whereby when a load exceeding a predetermined amount is placed on one of said bearings, the rod temporarily stretches allowing the bearing to move axially along the converging inclined surfaces of the upper and lower bearing rails so as to allow the bearing to self-adjust and allow the upper and lower bearing rails to move closer together and cause the load to be distributed to adjacent bearings during relative movement of said upper and lower frames with respect to each other.

18 Claims, 4 Drawing Figures

LOAD COMPENSATING ROLLER BEARING CONSTRUCTION

BACKGROUND OF THE INVENTION

The present relates to improvements in load compensating bearings and, in particular, to a roller circle construction for a machine having upper and lower frames rotatable with respect to each other and in particular relates to a load compensating roller circle in which peak roller loads which cause structural and bearing failures are reduced or eliminated by the use of a conical roller mounted on a stretchable roller rod between upper and lower converging or tapered bearing rails wherein, as the load on the roller increases beyond a predetermined amount, the rod will stretch thus causing the roller to move axially along the converging inclined surfaces of the upper and lower bearing rails so as to cause the roller to sustain less load and nearby rollers to carry a greater load. The improvement can also be used with first and second bearing surfaces moving in linear relationship with respect to each other.

In heavy equipment such as draglines, cranes, power shovels and the like, the lower portion of the equipment is stationary and the upper portion is rotatable with respect to the lower portion. In order for the rotatable movement to occur, a vertical center pin is provided with a surrounding circular bearing track or circle with an upper bearing rail attached to the upper frame, a lower bearing rail attached to the lower frame in juxtaposed relationship with the upper bearing rail and a roller bearing circle having a plurality of conical roller bearings therein for supporting the upper and lower bearing rails. Generally speaking, the roller bearing circle has a plurality of conical shaped roller bearings and the upper and lower bearing rails each have an inclined surface in juxtaposed relationship to form a pair of converging inclined surfaces being supported by the conical roller bearings in the circle. The rollers transmit the weight of the upper frame section and the load handled thereby to the roller bearing circle and thus to the lower frame section which is stationary. In machines of large size, the loads transmitted through the rollers to the lower frame are very heavy.

In those machines having a load handling boom or the like which is pivotally connected to the front edge of the rotating frame, the heaviest loads are transmitted to the roller circle bearings in the region of the front edge of the rotating frame. In other operations, such as when the upper frame is rotating with a load, the heaviest load is transferred to the bearings sequentially around the circle.

Thus it is well-known that the eccentric load imposed by the boom or a combination of a boom and a dipper in any given arc of travel of the upper frame of these machines during normal operations results in the application of nonuniform and highly concentrated loads on small segments of the bearing roller circles of such machines. Unless certain measures are taken to alleviate such highly concentrated loads and the high stresses developed by such loads, the rails and/or roller bearings begin to deteriorate and they eventually fail. The failure of rails and roller bearings of large machines is a costly matter. Where such failure occurs, the machine must be taken out of service thus adversely affecting its productivity and the rails and/or roller bearings must be replaced which are costly in terms of materials and labor.

In the prior art, several approaches have been taken to reduce roller failure thus prolonging the service live of the roller bearings. Rails and roller bearings have been redesigned. The metallurgy of rails and roller bearings have been improved. More recently it has been proposed to install a cushioning material such as rubber, neopreme or polyurethane between the upper rail and the upper frame and/or between the lower rail and the lower frame principally for the purpose of more uniformly distributing loads imposed on the roller circle over a greater arc thereby including a greater number of rail segments and roller bearings. These approaches however have not resolved the problems entirely and deleterious effect upon the roller bearings still occur.

The present invention aids in reducing the problems of the prior art by mounting the roller bearings in the roller circle on a stretchable rod which, under predetermined loads, temporarily stretches thus allowing the bearing to move axially along the stretchable rod and along the converging inclined surfaces of the upper and lower bearing rails thereby allowing the bearing to self-adjust and allow the upper and lower bearing rails to move closer together and cause the load to be distributed to adjacent bearings. The stretchable rod may be formed of a metal that has a required modulus of elasticity such as an aluminum alloy and which will temporarily stretch and then, when the load is removed, it will return to its original length.

In those embodiments wherein the upper and lower bearing rails form at least one pair of converging inclined surfaces being supported by the conical roller bearings in the circle, a replaceable roller flange is mounted on one end of the stretchable rod in slideable contact with at least one of the ends of the converging inclined surfaces of the upper and lower bearing rails for holding one end of the rod fixed when the rod stretches so as to allow the conical bearings to self-adjust. The roller flange may be a disk-shaped flange mounted for rotation on the stretchable rod in slideable contact with at least one of the ends of the converging inclined surfaces of the upper and lower bearing rails.

In another embodiment, one of the bearing rails has a smaller inside diameter than the other such that the disk shaped roller flange is in rotatable contact with only the end of the bearing rail having the smallest inside diameter.

Where both of the bearing rails have the same inside diameter, the disk shaped flange is mounted on one end of the stretchable rod and is in rotatable contact with the ends of both of the converging inclined surfaces for holding the one end of the rod fixed while the rod stretches. In this embodiment, needle or roller bearings may be placed in the outer radial portions of the disk shaped flange for smooth rolling contact of the roller flange on the ends of the upper and lower bearing rails.

In still another embodiment, for linear motion, the upper and lower bearing rails form two pair of inclined surfaces, one pair tapering from each side toward the center of the rail. First and second conical roller bearings are placed in the position for supporting the two pair of inclined surfaces and the first and second conical bearing rollers are mounted on a stretchable rod in the supporting position such that either or both of the conical bearings may move along the bearing rail inclined surfaces as the rod stretches and self-adjusts the bearings to the load applied thereto.

Thus it is an object of the present invention to mount conical roller bearings in a load compensating roller circle for axial movement as well as rotation such that any one of the bearings receiving a load greater than a predetermined amount will move axially along the converging inclined surfaces of the upper and lower rails so as to allow the bearing to self-adjust and allowing the upper and lower bearing rails to move closer together and cause the load to be distributed to adjacent bearings.

It is another object of the present invention for mounting said conical roller bearings on a stretchable metal rod which will increase its length under a predetermined pressure to allow the conical roller bearing to move along the tapered surface of the upper and lower bearing rails and thereby self-adjust.

It is still another object of the present invention to form the stretchable rod of an aluminum alloy.

It is also an object of the present invention to mount means on one end of the stretchable rod in slideable contact with at least one of the ends of the converging inclined surfaces of the upper and lower bearing rails for holding the one end of the rod fixed when the rod stretches to allow the conical bearings to move axially and self-adjust the load.

It is yet another object of the present invention to provide a disk shaped replaceable flange rotatably mounted on the stretchable rod and in slideable contact with at least one of the ends of the converging inclined surfaces of the upper and lower bearing rails for holding the one end of the rod fixed when the rod stretches.

It is still another object of the present invention to provide one of the bearing rails with a smaller inside diameter than the other such that the disk shaped replaceable flange is in rotatable contact with only the end of the bearing rail having the smaller inside diameter.

It is an object of the present invention to provide both of said bearing rails with the same inside diameter such that the disk shaped flange is in rotatable contact with the ends of both of the converging inclined surfaces for holding the one end of the rod fixed while the rod stretches.

It is also an object of the present invention to provide bearings in the outer radial portion of the disk shaped flange for minimal frictional contact of the flange with the ends of the converging inclined surfaces of the upper and lower bearing rails.

It is yet another object of the present invention to provide the upper and lower bearing rails with two pair of inclined surfaces, one pair tapering from each side toward the center of the rail, with first and second conical bearing rollers in a position for supporting the two pair of inclined surfaces and the stretchable rod for mounting each pair of conical bearing rollers in the supporting position such that either or both of the conical bearings may move along the bearing rail inclined surfaces as the rod stretches and self-adjusts the load applied thereto.

SUMMARY OF THE INVENTION

The present invention relates to an improved load compensating roller support for a machine having upper and lower bearing rails forming at least one pair of converging inclined surfaces being supported by conical roller bearings in the support and comprising means for mounting each of the conical roller bearings in the support for resilient radial movement as well as rotation such that any one of the bearings receiving a load greater than a predetermined amount will move radially along the converging inclined surfaces of the upper and lower rails so as to allow the bearing to self-adjust and to allow the upper and lower bearing rails to move closer together and to cause the load to be distributed to adjacent bearings.

The present invention also relates to a method of construction of a load compensating roller support for a machine having upper and lower frames rotatable with respect to each other comprising the steps of forming a roller bearing support having a plurality of conical roller bearings therein, attaching an upper bearing rail to the upper frame, attaching a lower bearing rail to the lower frame in juxtaposed relationship with the upper bearing rail, forming at least one pair of converging inclined surfaces on said upper and lower bearing rails with the rails being supported by the conical roller bearings in the support, and mounting each of the conical roller bearings in the support for resilient radial movement as well as rotation such that any one of the bearings receiving a load greater than a predetermined amount will move radially along the converging inclined surfaces of the upper and lower rails so as to allow the bearing to self-adjust and to allow the upper and lower bearing rails to move closer together and cause the load to be distributed to adjacent bearings.

BRIEF DESCRIPTION OF THE DRAWINGS

These and other objects of the present invention will be disclosed in conjunction with accompanying drawings in which like numerals represent like components and in which.

DETAILED DESCRIPTION OF THE DRAWINGS

Figure 1:
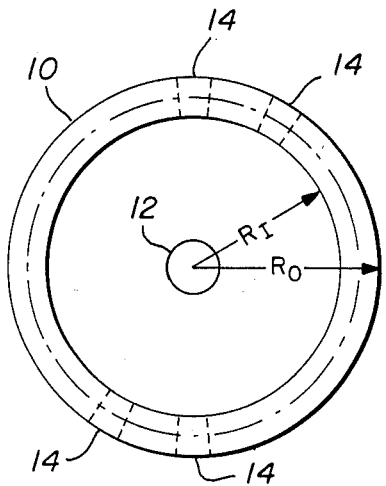
FIG. 1 is a top view of a representative bearing roller circle which is used for coupling upper and lower rotatable frame sections of heavy equipment together.

FIG. 1 is a top view of a standard roller bearing circle for support of a rotatable upper frame with respect to a stationary lower frame. The circle 10 is centered about a post 12 about which the upper frame rotates. The circle 10 comprises a plurality of bearings 14 usually of conical or tapered shape. Only a few of the bearings are shown in FIG. 1 for purposes of simplicity. The roller circle has an outside diameter of $R_o$ and an inside diameter $R_i$.

It can be readily understood from FIG. 1 that if the majority of the weight of the upper rotating section should happen to fall along the line indicated $R_o$, it is possible that that weight could be concentrated on a single bearing which could cause undue wear on the bearing and premature failure. It is important that the bearings on either side of that bearing where the majority of the load is concentrated be able to support some of the load.

Figure 2:
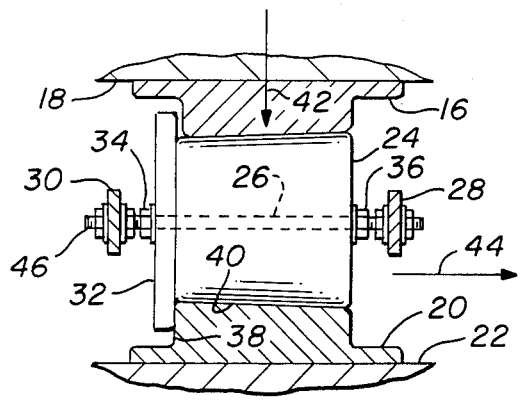
FIG. 2 is a side view of a conical roller bearing being mounted on a stretchable rod between upper and lower bearing rails so that the conical bearing can move radially along the inclined surfaces of the bearing rails to cause the load to be distributed to adjacent bearings; the lower bearing rail shown in FIG. 2 has a smaller inside diameter than the upper rail segment thereby allowing a replaceable roller flange to be mounted on one end of the stretchable rod in slideable contact with the end of the inclined surface of the lower bearing rail to hold the one end of the rod fixed when the rod stretches to allow the conical bearings to self-adjust.

FIG. 2 is a side view of an embodiment of the invention which enables a load compensating roller circle to be constructed which will allow a bearing receiving an undue predetermined load to adjust itself so that a portion of the load is shared by adjacent bearings. As can be seen in FIG. 2, an upper bearing rail 16 is attached to the upper frame 18 and a lower bearing 20 is attached to the lower frame 22. These two bearing rails 16 and 20 are supported by a conical or tapered bearing 24. Bearing 24 is rotatably mounted on a rod 26 and is held in spaced relationship to other bearings (not shown) with roller spacing bands or supports 28 and 30. It will be noted in FIG. 2 that the lower bearing rail 20 is of greater width, or smaller inside diameter, than upper bearing rail 16. This allows a replaceable roller flange 32 to be mounted on one end of rod 26 and held by nuts 34 and 36 and to be in slidable contact with the end 38 of the inclined surface 40 of lower bearing rail 20. Flange 32 may be in the form of a disk. Rod 26 is made of a metal which will stretch a predetermined amount under load and still return to its original shape. This quality is defined as "elasticity" or "resilience". Such a metal, may be for instance, an aluminum alloy.

Thus when the load in the direction of arrow 44 exceeds a predetermined amount, rod 26 stretches thereby allowing the bearing 24 to move outwardly in the direction of arrow 44. The bearing rails 16 and 20 then move closer together thereby distributing the load or weight to the bearings on either side thereof. Replaceable roller flange 32 holds the outer end 46 of rod 26 stationary or fixed while the remainder of the rod 26 stretches to the right. Roller flange 32 rests against edge 38 of the lower bearing rail 20 thus preventing the end 46 of rod 26 from moving while the rod 26 stretches and the bearing 24 moves to the right in the direction of arrow 44 in FIG. 2. The end or wear surface 38 of lower bearing rail 20 which is in contact with the roller flange 32 may be coated with a lubricant to minimize friction.

Figure 3:
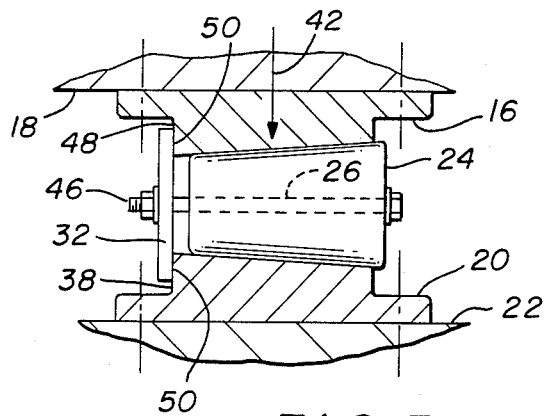
FIG. 3 is a side view of another embodiment of the present invention in which the upper and lower bearing rails have the same inside diameter such that the disk shaped flange is in rotatable contact with the ends of both of the converging inclined surfaces of the upper and lower bearing rails for holding the one end of the rod fixed while the rod stretches.

A second embodiment of the invention is illustrated in FIG. 3. In this embodiment the inside diameter of upper bearing rail 16 and lower bearing rail 20 are identical. Therefore in this case the replaceable roller flange 32 engages the end surface 48 of the upper bearing rail 16 and the end surface 38 of the lower bearing rail 20. In order to minimize friction in this case, bearings 50 may be mounted in the outer radial surface of the disk shaped roller flange 32 in order to have minimal contact with surfaces 38 and 48. Again, as the load in the direction of arrow 42 exceeds a predetermined amount, the rod 26 will temporarily stretch and the bearing 24 will move to the right in FIG. 3 in order to allow the bearing rails 16 and 20 to move closer together thus sharing the load with adjacent bearings. In this particular case, the inner end 46 of the stretchable rod 26 is held fixed by the replaceable roller flange 32 being held in frictional engagement against ends 38 and 48 of upper bearing rail 16 and lower bearing rail 20. The bearings 50 may be either needle or roller bearings for smooth rolling of the roller flange on the ends of bearing rails 16 and 20. Again, when the load is removed from the bearing 24, the rod 26 will return to its original length.

Figure 4:
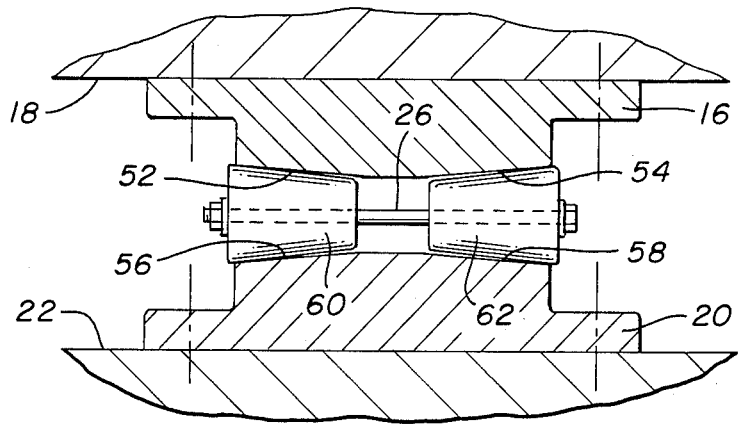
FIG. 4 is yet another embodiment of the present invention in which the upper and lower bearing rails form two pair of inclined surfaces, one pair tapering from each side toward the center of the rail with first and second conical bearing rollers in position for supporting the two pair of inclined surfaces and a stretchable rod for mounting each pair of conical bearing rollers in the supporting position such that either or both of the conical bearings may move along the bearing rail inclined surfaces as the rod stretches and self-adjust to the load applied thereto.

FIG. 4 is still another embodiment of the present invention for use with two surfaces in linear motion with respect to each other and again having an upper bearing rail 16 attached to the upper frame 18 and a lower bearing rail 20 attached to the lower machine frame 22. The upper bearing rail 16 has a first inclined slope 52 and a second inclined slope 54 which taper from each side toward the center of the rail. In like manner, the bottom rail 20 has a first inclined slope 56 and a second inclined slope 58 each of which tapers from each side toward the center of the rail. Thus inclined surfaces 52 and 56 form one pair of inclined surfaces which tapers from the inside of a linear bearing support such as 28 and 30 in FIG. 2 to the center of the bearing rails 16 and 20 while the other surfaces 54 and 58 form a second pair of inclined surfaces tapering from the outside of the bearing support toward the center of the bearing rails. First and second conical roller bearings 60 and 62 are in a position for supporting the two pair of inclined surfaces with bearing 60 supporting inclined surface pairs 52 and 56 and bearing 62 supporting inclined surface pair 54 and 58. Again, a stretchable rod 26 is utilized for mounting each pair of conical bearing rollers in the supporting position such that either or both of the conical bearings 60 and 62 may move along the bearing rail inclined surface pairs, 52, 56 or 54, 58 as rod 26 stretches and thus self-adjusts to the load applied thereto. In this case, no replaceable roller flange is needed as each of the bearings 60 and 62 provide the necessary counterbalance for the other.

Consider the following example with a roller circle having a 16 inch diameter roller and a 330 inch roller circle radius. In the following example, the assumptions and constraints used are as follows:

1. A one inch diameter (R=0.5) and 20 inch long (L=20) spring rod made from an aluminum alloy having a modulus of elasticity $E = 12 \times 10^6$ lb./in.$^2$.

2. A 1.3887° taper along the outside diameter of the roller bearing.

3. Assumed the desired average roller bearing load is to be 200,000 lbs. The spring rod will be preloaded so that it will not stretch until a roller bearing load greater than 200,000 lbs. exists. When a roller load in excess of 200,000 lbs. occurs, the roller will then, and only then, move down the slope of the bearing rails.

4. Neglect the deflection of the roller flange in this example for simplicity since this deflection would only be approximately 0.003 in. for a 200,000 lbs. roller load if the flange were 2.0 inches thick.

5. Assume that 375,000 lbs. is the maximum roller load during a dynamic operating condition.

A summary of the analysis is as follows:

(a.) thrust load, P, on the roller bearing for 200 kips roller load where kip=thousand pounds:

$$P = 2 \times 200{,}000 \times \tan 1.3887° = 9.677 \text{ kips};$$

(b.) spring load deflection, δ under pre-load $$\delta = P \times \frac{PL}{AE}$$

P=thrust load, L=rod length,
A=area of rod and E=modulus of elasticity $$\delta = \frac{(9.677)(20)(10)(1{,}000)}{\pi(.5)^2(12 \times 10^6)} = .0254 \text{ in.}$$

(c.) spring constant, k, of spring rod;

$$k = \frac{P}{\delta} = \frac{(9{,}677)(1{,}000)}{.02054} = 471.24 \text{ kips/in.}$$

(d.) stress, θ, in spring rod under pre-load;

$$\theta = \frac{P}{A} = \frac{(9.677)(1{,}000)}{\pi(.5)^2} = 12.32 \text{ kip/in.}^2$$

(e.) spring rod deflection, ρ, under a maximum roller load of 375 kips;

$$P = (2) \times (375{,}000) \times (\tan. 1.3877°) = 18.18 \text{ kips, and}$$

$$\delta = \frac{PL}{AE} = \frac{(18.18)(1{,}000)(20.0)}{\pi(.5)2\,(12)(106)} = 0.03858 \text{ in.}$$

(f.) stress, θ, in spring rod under a 375 kip roller load;

$$\theta = \frac{P}{A} = \frac{(18.18)(1{,}000)}{(.5)^2} = 23.15 \text{ kip/in.}^2$$

Since aluminum alloys are available with yield strengths greater than 70 kip/in$^2$, the stress level found in (f) above is acceptable for use as indicated. This stress level should, however, never be reached since the load compensating roller circle will tend to even the roller load distribution. For example the average of the ten highest loaded rollers during a dynamic dump condition during an operating analysis was only 256 kips. The above analysis also applies to two surfaces moving in a linear relationship with respect to each other.

Thus there has been disclosed a novel load compensating roller circle which utilizes tapered bearings in matching relationship with tapered bearing rails and wherein a stretchable rod is used to mount the bearings so that when the load on any particular bearing exceeds a predetermined level, the rod will stretch to allow the bearing to slide relative to the inclined surfaces of the bearing rails thus allowing the bearing rails to move closer together and distribute the load to adjacent bearings.

While the invention has been described in connection with a preferred embodiment, it is not intended to limit the scope of the invention to the particular form set forth but, on the contrary, it is intended to cover such alternatives, modifications, and equivalents as may be included within the spirit and scope of the invention as defined by the appended claims.

I claim:

1. A load compensating roller bearing construction for a device having upper and lower frames movable with respect to each other comprising:
   a. a roller bearing support having a plurality of conical roller bearings therein;
   b. an upper bearing rail attached to said upper frame,
   c. a lower bearing rail attached to said lower frame in juxtaposed relationship with said upper bearing rail,
   d. said upper and lower bearing rails forming at least one pair of converging inclined surfaces being supported by said conical roller bearings in said support, and
   e. means for mounting each of said conical roller bearings in said support for temporary radial movement as well as rotation such that any one of said bearings receiving a load greater than a predetermined amount will temporarily move radially along said converging inclined surfaces of said upper and lower rails so as to allow said bearing receiving said greater load to self-adjust and allow said upper and lower bearing rails to move closer together and cause said load to be distributed to adjacent bearings during relative motion of said upper and lower frames.

2. A roller bearing construction as in claim 1 further comprising:
   a. a circular band forming said roller bearing support for enabling rotatable movement of said upper frame with respect to said lower frame,
   b. said upper and lower bearing rails being formed in super-imposed circular shape, and
   c. a resilient stretchable metal rod forming said mounting means in each of said bearings which will temporarily increase its length while under a predetermined load to allow said conical roller bearings to move along the tapered surface of said upper and lower bearing rails and thereby self-adjust during relative rotation of said upper and lower frames.

3. A roller construction as in claim 2 wherein said resilient stretchable rod is formed of an aluminum alloy.

4. A roller construction as in claim 3 further comprising means mounted on one end of said strectchable rod in slidable contact with at least one of the ends of said converging inclined surfaces of said upper and lower bearing rails for holding said one end of said rod fixed when said rod resiliently stretches to allow said conical bearing to self-adjust.

5. A roller construction as in claim 4 wherein said rod end holding means comprises:
   a. a disk flange replaceable flange, and
   b. means for rotatably mounting said disk flange on said rod in slideable contact with said at least one end of said converging inclined surfaces of said upper and lower bearing rails for holding said one end of said rod fixed when said rod resiliently stretches.

6. A roller construction as in claim 5 further comprising one of said bearing rails having a smaller inside diameter than the other such that said disk flange is in rotatable contact with the end of only said rail having said smaller inside diameter.

7. A roller construction as in claim 5 further comprising both of said bearing rails having the same inside diameter such that said disk flange is in rotatable contact with the ends of both of said converging inclined surfaces for holding said one end of said rod fixed while said rod resiliently stretches.

8. A roller construction as in claim 7 further comprising bearings in the outer radial surface of said disk flange for minimal frictional contact of said flange with said ends of both said converging inclined surfaces of said upper and lower bearing rails.

9. A roller construction as in claim 1 further comprising:
   a. said upper and lower bearing rails forming two pair of inclined surfaces, one pair tapering from each side toward the center of said rails,
   b. first and second conical roller bearings in a position for supporting said two pair of inclined surfaces, and
   c. a resiliently stretchable rod for mounting each pair of conical roller bearings in said supporting position such that either or both of said conical bearings may move along said bearing rail inclined surfaces as said rod temporarily stretches and self-adjusts to the load applied thereto as said upper and lower surfaces move linearly relative to each other.

10. A method of constructing a load compensating roller bearing support for a machine having upper and lower frames moveable with respect to each other comprising:
   a. forming a roller bearing support having a plurality of conical roller bearings therein,
   b. attaching an upper bearing rail to said upper frame,
   c. attaching a lower bearing rail to said lower frame in juxtaposed relationship with said upper bearing rail,
   d. forming at least one pair of converging inclined surfaces with said upper and lower bearing rails, said surfaces being supported by said conical roller bearings in said support, and
   e. mounting each of said conical roller bearings in said support for temporary radial movement as well as rotation such that any one of said bearings receiving a load greater than a predetermined amount will temporarily moves radially along said converging inclined surfaces of said upper and lower rails so as to allow said bearing receiving said greater load to self-adjust and allow said upper and lower bearing rails to move closer together and cause said load to be distributed to adjacent bearings during relative motion of said upper and lower frames.

11. A method of constructing the roller circle as in claim 10 further comprising the steps of:
   a. forming said roller bearing support as a circular band for enabling rotatable movement of said upper frame with respect to said lower frame,
   b. forming said upper and lower bearing rails in superimposed circular shape, and
   c. mounting a resiliently stretchable metal rod in each of said bearings which will temporarily increase its length while under a predetermined load to allow said conical roller bearings to move radially along the tapered surface of said upper and lower bearing rails and thereby self-adjust during relative rotation of said upper and lower frames.

12. A method of constructing a roller circle as in claim 11 further comprising the step of forming said resilient stretchable rod of an aluminum alloy.

13. A method of constructing a roller circle as in claim 12 further comprising the step of mounting means on one end of said stretchable rod in slideable contact with at least one of the ends of said converging inclined surface of said upper and lower bearing rails for holding said one end of said rod fixed when said rod resiliently stretches to allow said conical bearing to self-adjust.

14. A method as in claim 13 wherein the step of mounting means to hold said rod end further comprises the steps of:
   a. providing a disk flange, and
   b. rotatably mounting said disk flange on said rod in slideable contact with said at least one end of said converging inclined surfaces of said upper and lower bearing rails for holding said one end of said rod fixed when said rod resiliently stretches.

15. A method as in claim 14 further comprising the step of forming one of said bearing rails with a smaller inside diameter than the other such that said disk flange is in rotatable contact with the end of only said rail having said smaller inside diameter.

16. A method as in claim 14 further comprising the step of forming both of said bearing rails with the same inside diameter such that said disk flange is in rotatable contact with the ends of both of said converging inclined surfaces for holding said one end of said rod fixed while said rod resiliently stretches.

17. A method as in claim 16 further comprising the step of providing bearings in the outer radial surface of said disk flange for minimal frictional contact of said flange with said ends of both said converging inclined surfaces of said upper and lower bearing rails.

18. A method as in claim 10 further comprising the steps of:
   a. forming two pair of inclined surfaces with said upper and lower bearing rails, one pair tapering from each side toward the center of said rails,
   b. supporting said two pair of inclined surfaces with first and second conical roller bearings, and
   c. mounting each pair of conical roller bearings on a resiliently stretchable rod for supporting said two pair of inclined surfaces such that either or both of said conical bearings may move along said bearing rail inclined surfaces as said rod resiliently stretches and self-adjusts to the load applied thereto as said upper and lower surfaces move linearly with respect to each other.

* * * * *